(12) United States Patent
Pasztor et al.

(10) Patent No.: US 7,788,293 B2
(45) Date of Patent: Aug. 31, 2010

(54) GENERATING STRUCTURED INFORMATION

(75) Inventors: Egon Pasztor, Mountain View, CA (US); Daniel Egnor, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 11/366,162

(22) Filed: Mar. 1, 2006

(65) Prior Publication Data

US 2006/0200478 A1 Sep. 7, 2006

Related U.S. Application Data

(60) Provisional application No. 60/658,214, filed on Mar. 2, 2005.

(51) Int. Cl.
*G06F 7/00* (2006.01)
*G06F 17/30* (2006.01)
*G06F 15/16* (2006.01)

(52) U.S. Cl. .................................. 707/804; 707/722
(58) Field of Classification Search .................. 707/804, 707/722
See application file for complete search history.

(56) References Cited

U.S. PATENT DOCUMENTS

| | | | |
|---|---|---|---|
| 6,834,276 B1 * | 12/2004 | Jensen et al. .................. 707/2 |
| 2003/0145310 A1 * | 7/2003 | Thames et al. ............... 717/123 |
| 2003/0154071 A1 * | 8/2003 | Shreve .......................... 704/9 |
| 2003/0182310 A1 * | 9/2003 | Charnock et al. ........ 707/104.1 |
| 2004/0024739 A1 * | 2/2004 | Copperman et al. ............ 707/1 |
| 2004/0107125 A1 * | 6/2004 | Guheen et al. ................. 705/7 |
| 2004/0243560 A1 * | 12/2004 | Broder et al. .................. 707/3 |
| 2005/0055321 A1 * | 3/2005 | Fratkina et al. ............... 706/45 |

OTHER PUBLICATIONS

S. Brin, "Extracting Patterns and Relations from the World Wide Web," WebDB Workshop at 6th International Conference on Extending Database Technology (EDBT'98), Mar. 23-27, 1998, pp. 172-183.*

C. H. Chang and S. C. Lui, "IEPAD: Information Extraction Based on Pattern Discovery," WWW10 '01, ACM, May 1-5, 2001, pp. 681-688.*

O. Etzioni, M. Cafarello, D. Downey, S. Kok, A.-M. Popescu, T. Shaked, S. Soderland, D. S. Weld and A. Yates, "Web-scale Information Extraction in KnowItAll (Preliminary Results)," WWW2004, ACM, May 17-20, 2004, pp. 100-110.*

(Continued)

*Primary Examiner*—Greta L Robinson
*Assistant Examiner*—Brian E Weinrich
(74) *Attorney, Agent, or Firm*—Fenwick & West LLP

(57) ABSTRACT

Structured and/or unstructured data about enterprises are acquired from one or more sources such as commercial data providers, enterprise web sites, and/or directory web sites. Strings are extracted from the unstructured data. The strings contain key, value pairs describing facts about the enterprises. The extracted strings are parsed to normalize the keys and values and place them in a machine-understandable structured representation. Some keys and/or values cannot be normalized. The facts are clustered with the enterprise to which they pertain. Normalized facts from different sources are compared and confidence levels and/or weights are assigned to the facts. These confidence levels and weights are used to select the facts that are displayed on a page for the enterprise in a directory.

18 Claims, 5 Drawing Sheets

OTHER PUBLICATIONS

A. McCallum and B. Wellner, "Object Consolidation by Graph Partitioning with a Conditionally-Trained Distance Metric," SIGKDD '03 Workshop on Data Cleaning, ACM, Aug. 24-27, 2003, 6 pages.*

Brill, E. et al., "An Analysis of the AskMSR Question-Answering System," Proceedings of the Conference on Empirical Methods in Natural Language Processing (EMNLP), Jul. 2002, pp. 257-264.

Brin, S., "Extracting Patterns and Relations from the World Wide Web," 12 pages.

Chang, C. et al., "IEPAD: Information Extraction Based on Pattern Discovery," WWW10 '01, ACM, May 1-5, 2001, pp. 681-688.

Chu-Carroll, J. et al., "A Multi-Strategy with Multi-Source Approach to Question Answering," 8 pages.

Dean, J. et al., "MapReduce: Simplified Data Processing on Large Clusters," To appear in OSDI 2004, pp. 1-13.

Etzioni, O. et al., "Web-scale Information Extraction in KnowItAll (Preliminary Results)," WWW2004, ACM, May 17-20, 2004; 11 pages.

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L, et al., "Answer Formulation for Question-Answering," 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

PCT International Search Report and Written Opinion, PCT/US06/07639, Sep. 13, 2006, 6 pages.

Prager, J. et al., "IBM's PIQUANT in TREC2003," 10 pages.

Prager, J. et al., "Question Answering using Constraint Satisfaction: QA-by-Dossier-with-Constraints," 8 pages.

Ramakrishnan, G. et al., "Is Question Answering an Acquired Skill?", WWW2004, ACM, May 17, 2004, pp. 111-120.

* cited by examiner

GENERATING STRUCTURED INFORMATION

CROSS-REFERENCE TO RELATED APPLICATIONS

This application claims the benefit of U.S. Provisional Application No. 60/658,214, filed Mar. 2, 2005, which is hereby incorporated by reference herein.

BACKGROUND OF THE INVENTION

1. Field of the Invention

This invention pertains in general to extracting information from a network and in particular to building a set of structured information from electronic documents on the network.

2. Description of the Related Art

Information on the Internet or another network can be difficult to find. Search engines allow users to locate content having specified characteristics. In some cases, however, the effectiveness of search engines is undermined by the sheer volume of information available on the Internet. For example, a person searching for a restaurant with a common name, such as "Tom's Restaurant" will receive a large number of matching results through which the person must wade to find the correct restaurant.

One way to remedy the "too much information" problem is to enable searching on a smaller set of information. A search engine can allow a person to search a directory specific to a particular city or other geographic area. That way, a person looking for "Tom's Restaurant" in New York, N.Y., can specify that the search should be limited to only restaurants in New York City. As a result, there are likely to be fewer search results, and it will be easier for the searcher to find the correct result. Moreover, the local directory can provide additional features, such as providing a map showing the location of the restaurant.

Building a directory with robust functionality is a complex process. Certain types of information, such as names, addresses, and telephone numbers for restaurants and other enterprises within a city are relatively easy to obtain. Telephone companies and other data providers often sell information of this type. However, in order to be effective the directory should include additional information that is not available from standard information providers, such as business hours, reservations policies, payment options, and whether parking is available. Ideally, the directory would maintain this information in a structured format that supports complex queries such as "find restaurants open past midnight on Tuesdays" and "show restaurants with valet parking that take reservations." Directories of this type have not been created due to the difficulties in gathering and representing the information.

Oftentimes, the information needed to build such a directory is available on the Internet. A restaurant might have its own web page that provides important details like its hours and reservations policy. Similarly, there might be one or more existing web directories that include entries for restaurants. Usually, though, this information is either unstructured or structured in an unsuitable manner. For example, the restaurant's web page might describe its business hours by using the phrase "closed Mondays" while the existing local directory specifies the same information as "Open: T W TH F S." This variety of ways to express the same information makes it difficult to build a unified directory having structured information acquired from a variety of different sources.

Therefore, there is a need in the art for a way to build a structured, or at least partially structured, collection of information for a directory.

BRIEF SUMMARY OF THE INVENTION

The above need is met by a system, method, and computer program product for generating structured data. In one embodiment, the system comprises a data acquisition module that receives an electronic document containing unstructured data describing facts about an enterprise. The system also comprises a data extraction module that extracts the unstructured data describing facts about the enterprise from the electronic document. Further, the system comprises a data parsing module for receiving the extracted unstructured data and creating structured representations of the facts described by the unstructured data.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. Overview

Figure 1:
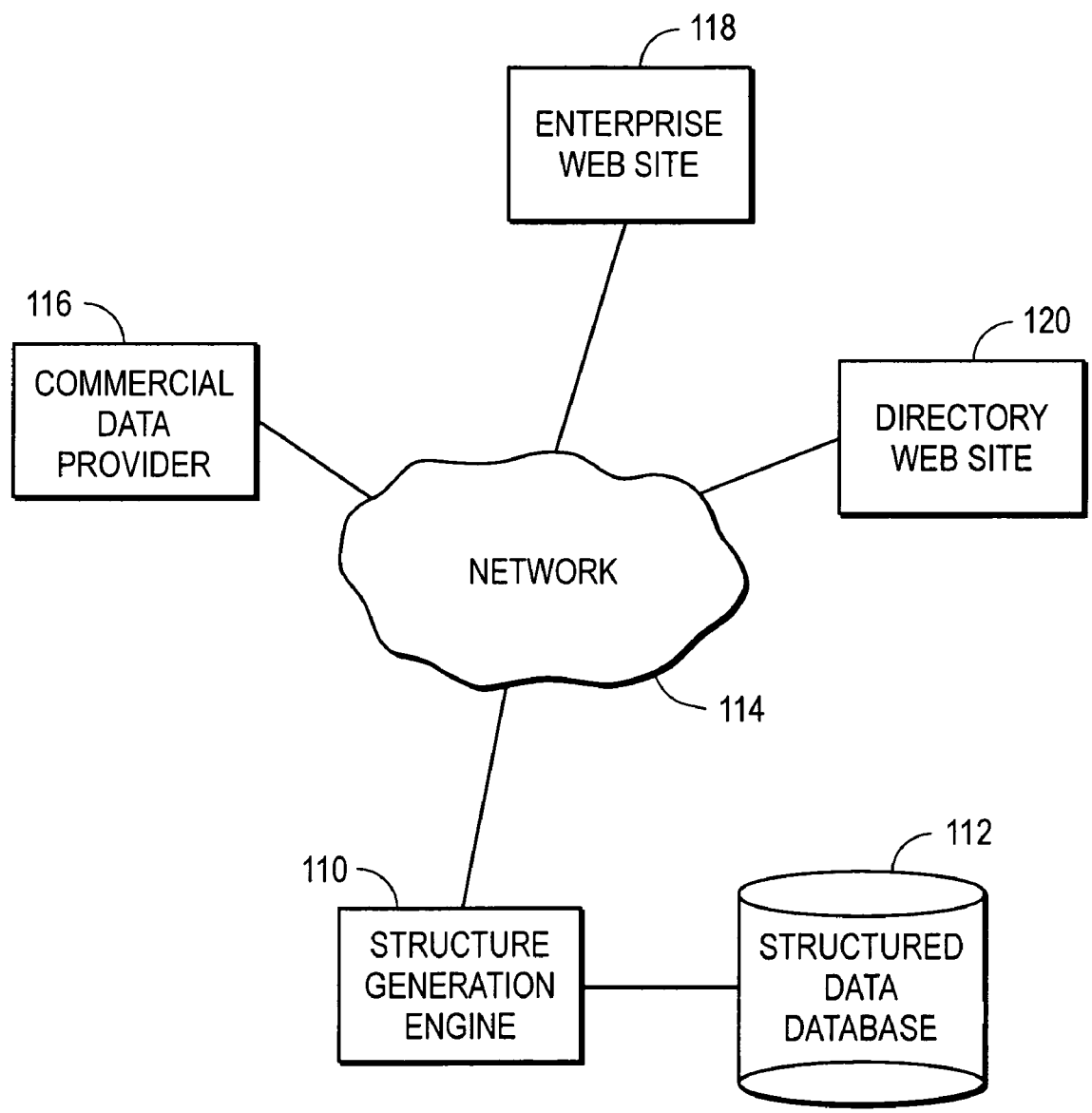
FIG. 1 is a high-level block diagram of a computing environment for generating structured information from multiple unstructured and/or structured sources according to one embodiment of the present invention.

FIG. 1 is a high-level block diagram of a computing environment 100 for generating structured information from multiple unstructured and/or structured sources according to one embodiment of the present invention. FIG. 1 illustrates a structure generation engine 110 coupled to a structured information database 112. The structure generation engine 110 is connected to a network 114 that is also connected to a commercial data provider 116, an enterprise web site 118, and a directory web site 120. In some embodiments, one or more of these latter three entities are absent.

At the highest level, the structure generation engine 110 collects data from multiple sources on the network 114. The data are unstructured or structured. The structure generation engine 110 parses the data to create structured facts. The structured information database 112 stores the structured facts. The structured facts are presented via the network 114 as entries in a local directory, as results to a search query, and/or in response to another request for information.

Structured data are data that have been organized to allow identification and separation of the key (i.e., context) of the data from the content. Structured data can be understood by a computer or other machine. For example, consider a telephone number organized in the structure "TN:xxx-xxx-xxxx" where an "x" denotes a number. A computer-implemented process that encounters data organized in this format, such as "TN:212-864-6137", can determine that the key for the data is a telephone number, and the value of the number is 212-864-6137. Unstructured data are data that are not organized in a particular format and where ascertaining the context and content might be difficult. Semi-structured data are data that are partially organized.

The structure generation engine 110 is a hardware and/or software device that collects and structures data from multiple sources on the network 114. The engine 110 includes functionality for interfacing with a variety of data sources via the network 114. For example, the engine 110 includes an interface for receiving data from one or more commercial data providers 116. Likewise, the engine 110 can retrieve web pages and/or other electronic documents from web sites such as the enterprise web site 118 and directory web site 120. The engine 110 analyzes the received data to identify facts formed of key-value pairs. The engine 110 normalizes the facts' keys and values to produce structured data.

In one embodiment, the structure generation engine 110 receives data related to enterprises local to a particular geographic region such as a city. An "enterprise" is a business, school, government office, non-profit organization and/or other similar entity. In one embodiment the enterprise is a restaurant, and the data received by the structure generation engine 110 relate to aspects of the restaurant, such as its business hours, reservation policies, and accepted payment methods. However, it will be understood by those of skill in the art that the structure generation engine 110 can be used to structure information for enterprises other than restaurants. In addition, the data received by the structure generation engine 110 need not be limited to specific geographic regions.

The structured facts database 112 stores the structured facts generated by the structure generation engine 110 and/or from other sources. In one embodiment, the structured information database 112 is a relational database that supports queries made in the structured query language (SQL). Other embodiments utilize different types of databases.

In one embodiment, the structured facts about enterprises in the database 112 are utilized to support a local directory for a geographic region. The facts in the local directory are made available on a web site on the network 114. An end-user, such as a person using a computer, cell phone, or other network-connected device can access the directory and request facts about enterprises. For example, the end-user can issue a query for a particular restaurant. In response, the local directory returns one or more web pages describing facts about the restaurant, such as its name, phone number, address, business hours, reservations policy, parking availability, acceptable payment options, etc. In some embodiments, the end-users can issue queries of other types, such as queries for all restaurants within a radius of a certain location, all restaurants that accept reservations, and/or all restaurants that are open past 10 PM. One example of such a local directory is the GOOGLE LOCAL service available from GOOGLE INC. of Mountain View, Calif.

The commercial data provider 116 shown in FIG. 1 represents the one or more commercial data providers that provide data to the structure generation engine 110 in some embodiments. Examples of commercial data providers include telecommunications providers such as telephone companies, media providers such as newspaper companies, and commercial directory providers, such as the D&B Corp. In some embodiments, the commercial data provider 116 provides a set of facts describing basic information about enterprises within a region, such as the names, addresses, and phone numbers for the enterprises. These data are typically structured. The commercial data provider 116 may provide the data to the structure generation engine 110 via the network 114 and/or through another communications channel.

The enterprise web site 118 shown in FIG. 1 represents the multiple web sites operated by or on behalf of enterprises. An example of an enterprise web site 118 is a site on the network 114 that provides information about a particular restaurant. In the usual case, the site provides pictures of the restaurant and information about the restaurant such as its name, address, phone number, business hours, acceptable payment methods, and reservation policy. In addition, the site might include other information like a sample menu and driving directions.

The thousands or millions of enterprise web sites 118 on the network represent possible data sources that the structure generation engine 110 can access. The data on the enterprise web sites 118 are oftentimes unstructured and/or structured in a variety of different formats. For example, one web site 118 might specify a restaurant's business hours as "open Mon to Fri 9-5, Sat until 6" while another specifies the hours as "open 6-2, closed Sundays and Holidays." These data lack a defined structure and are difficult for a computer to interpret.

The directory web site 120 represents one or more sites on the network 114 that provide information about multiple enterprises 120. In one embodiment the directory web site 120 is a preexisting directory of restaurants in geographic region. The directory web site 120 includes web pages that provide structured, semi-structured, and/or unstructured information about the restaurants. Oftentimes, the pages are at least partially structured. For example, each page for a restaurant in the directory web site 120 might contain the text "Reservations:" followed by a "yes" or "no" to indicate whether the restaurant takes reservations. However, some of the information on the page might not be structured. Moreover, different directory web sites 120 utilize different structures.

The network 114 represents the communication pathways between the structure generation engine 110 and the data sources 116, 118, 120. In one embodiment, the network 114 is the Internet. The network 114 can also utilize dedicated or private communications links that are not necessarily part of the Internet. In one embodiment, the network 114 carries traffic using standard communications technologies and/or protocols. Thus, the network 114 can include links using technologies such as 802.11, integrated services digital network (ISDN), digital subscriber line (DSL), asynchronous transfer mode (ATM), etc. Similarly, the networking protocols used by traffic on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
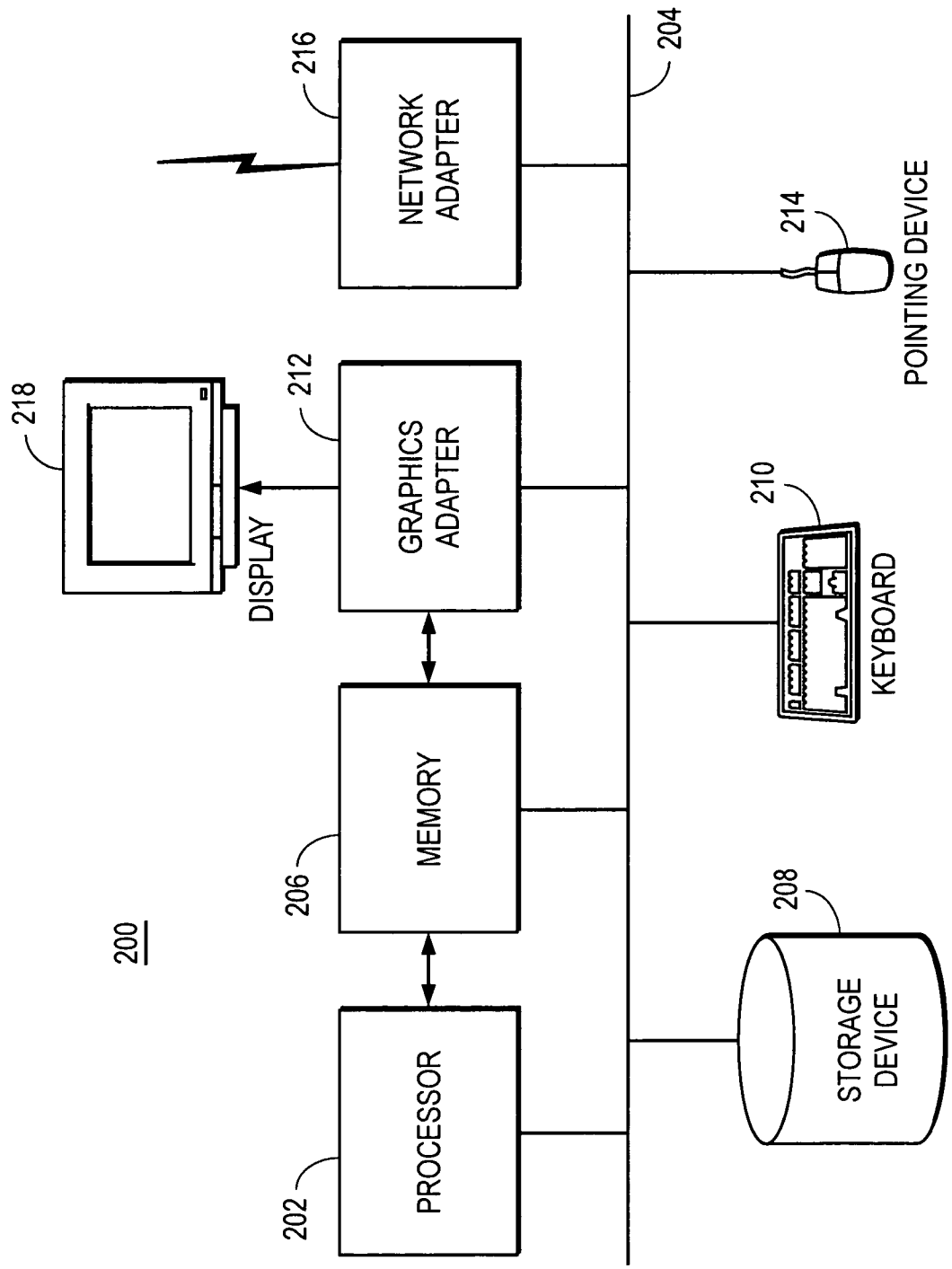
FIG. 2 is a high-level block diagram illustrating a functional view of a computer for use as one of the entities illustrated in the environment of FIG. 1 according to one embodiment.

FIG. 2 is a high-level block diagram illustrating a functional view of a computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to the network 114. In many instances the computer lacks one or more of the elements shown in FIG. 2, such as a keyboard 210, pointing device 214, graphics adaptor 212, and/or display 218.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required by the entity. An enterprise web site 118 might be provided by a web server running on a single computer 200. The directory web site 120, in contrast, might be provided by a web server running on a more powerful computer and/or one or more blade servers operating in tandem. Likewise, in one embodiment the structure generation engine 110 comprises one or more modules executing on one or more blade servers or other types of computers working together to provide the functionality described herein.

Figure 3:
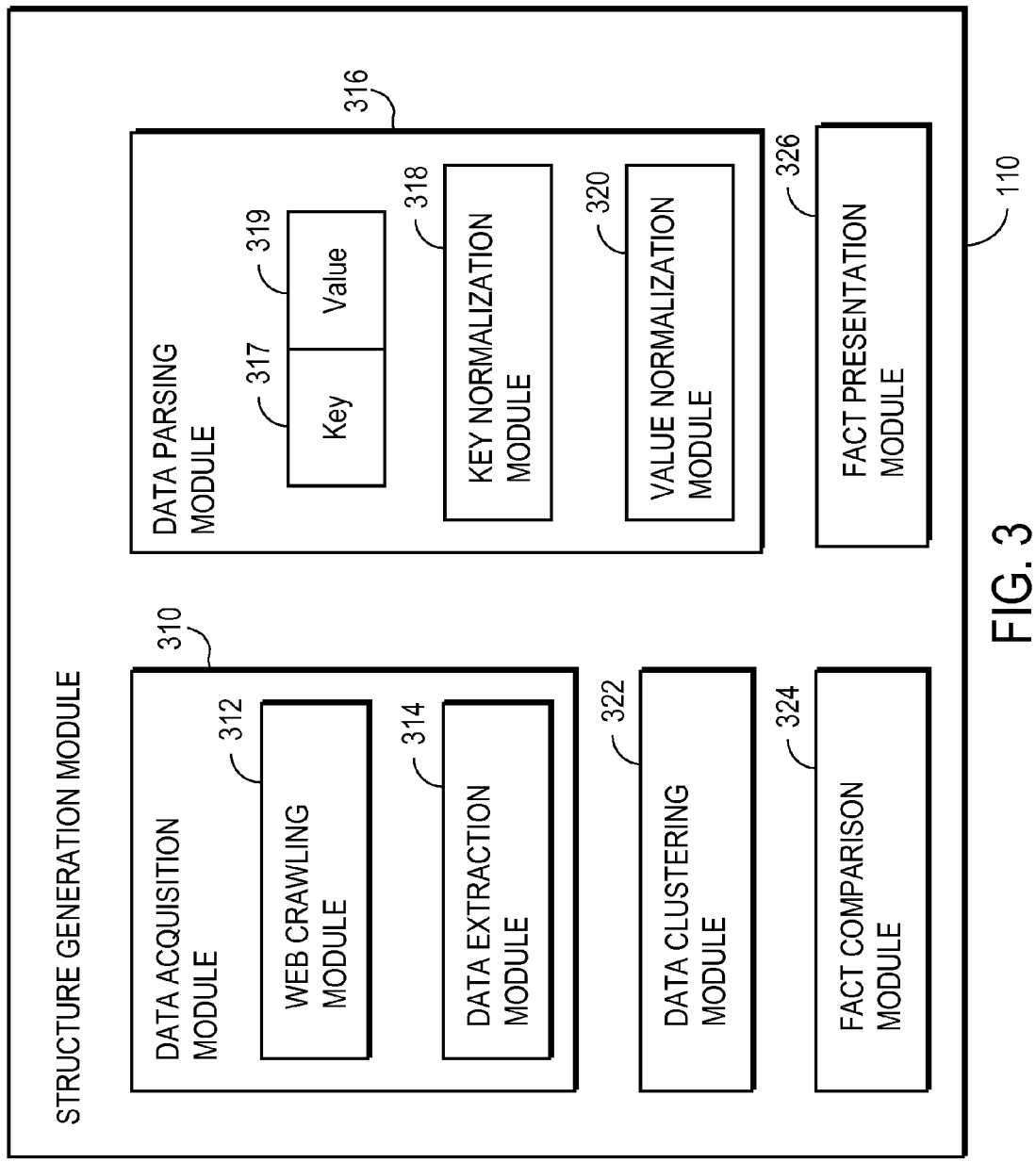
FIG. 3 is a high-level block diagram illustrating modules within the structure generation engine according to one embodiment.

FIG. 3 is a high-level block diagram illustrating modules within the structure generation engine 110 according to one embodiment. Other embodiments have additional and/or different modules than the ones shown in the figure. In addition, the functionalities can be distributed among the modules in a manner different than described here. Further, some of the functions can be provided by entities other than the structure generation module 110.

A data acquisition module 310 acquires data about enterprises to be included in the directory. In one embodiment, the data acquisition module 310 receives data about the enterprises from the commercial data provider 116. These data are received, for example, by retrieving the data from a web site operated by the data provider 116, receiving a data feed specifying the data using XML or another format, loading the data from a DVD or other computer-readable media, etc. As mentioned above, the data from the commercial data provider 116 are structured and provide sets of basic facts about enterprises including their names, addresses, and/or telephone numbers.

In one embodiment, the data acquisition module 310 includes a web crawling module 312 for accessing data provided by web pages on the enterprise 118 and/or directory web sites 120. A web crawler is an automated program that accesses a web site and traverses through the site by following its links. The web crawler module 312 crawls the enterprise 118 and directory web sites 120 and, in one embodiment, stores the web pages it encounters to enable subsequent analysis. Depending upon the embodiments, the sites that the web crawler module 312 crawls are manually specified and/or selected programmatically based on data received from the commercial data provider 116 or other sources.

In one embodiment, the web crawler module 312 includes a general purpose crawler and one or more specific purpose crawlers. The general purpose crawler is utilized to crawl web sites having unknown formats. Enterprise web sites 118 are often created on an ad hoc basis, and each site's format might be completely unique. In one embodiment, the behavior of the general purpose crawler is optimized for such ad hoc sites having a wide variety of different formats.

A specific purpose crawler is utilized for crawling a directory web site 120 and/or an enterprise web site 118 where the format is known in advance. For example, assume a preexisting directory web site 120 has a set of web pages at a known base address that describe restaurants within a geographic region. The specific purpose crawler is manually coded to access the web site and retrieve only the web pages at that address. The specific purpose crawler can be coded to ignore certain links on a page, such as links having characteristics that make them likely to be advertisements or otherwise unlikely to provide information about the enterprise for which data are being collected. Similarly, the specific purpose crawler can be coded to select certain links in order to access only the pages likely to contain data about the enterprise.

In some embodiments, the data acquisition module 310 uses other techniques to acquire data describing the enterprises. In one embodiment, the enterprises send pre-structured fact text directly to the data acquisition module 310, similar to how the module receives data feeds from commercial data providers 116. In another embodiment, the data acquisition module 310 examines unsorted web pages found in a repository, such as web pages found in a cache of content retrieved from web sites connected to the network 114.

A data extraction module 314 extracts data about the enterprises from the web pages and/or other electronic documents stored by the web crawling module 312. Generally speaking, the extracted data describe aspects of the enterprises that end-users are likely to find beneficial in a directory of enterprises. In one embodiment, the extracted data includes an enterprise's:

- name, address, and/or phone number;
- business hours (i.e., when it is open);
- reservations policy;
- accessibility (i.e., handicap access);
- payments accepted;
- parking (i.e., what forms of parking are available);
- services provided; and
- brands offered.

Other embodiments extract different and/or additional data.

In one embodiment, the data extraction module 314 extracts from the web pages text strings likely to contain key, value pairs describing the enterprises. The data are extracted using general purpose and/or specific purpose extractors. In one embodiment, both the general and specific purpose extractors are formed of parsers having manually-constructed regular expressions. In other embodiments, some or all of the extractors are created using automated wrapper induction techniques.

The specific purpose extractors are optimized to extract information from web pages having known formats. For example, assume that all web pages about restaurants from a particular directory web site 120 are known to include the phrase "handicap accessibility:" followed by a "Y" or "N" at a particular location on the page. The specific purpose extractor contains a regular expression that locates the correct portion of the web page and extracts the "handicap accessibility" string. In one embodiment, a specific purpose extractor is adapted for web pages having two-column tables. In such tables, one column typically contains a key such as "parking" or "specialties" while the other column contains the value for the key. The specific purpose extractor extracts the key, value pairs from the table. The general purpose extractors extract the same types of information, but are designed to extract data from web pages having non-specific formats.

A data parsing module 316 transforms the extracted strings containing the key, value pairs into normalized representations of facts. To understand the functionality of the data parsing module 316, consider how two different web pages (and extracted strings) can represent whether an enterprise is accessible to handicapped persons. Assume one string is "Wheelchair Accessible: YES" while another string is "Handicap Access: Y." Both strings indicate that the enterprise is accessible to handicapped people, but differ in both keys (i.e., "Wheelchair Accessible" and "Handicap Access") and values (i.e., "YES" and "Y"). Likewise, consider the strings "hours: Monday to Friday 9-5" and "OPEN weekdays from 9:00 am to 5:00 pm." Both of these latter strings use different key, value pairs to represent the same business hours. The data parsing module 316 transforms both the keys 317 and the values 319, where possible, so that data from different sources are represented the same way. In one embodiment, the normalized representations of the facts are stored in the structured data database 112.

A key normalization module 318 normalizes keys 317 in the extracted strings. In general, key normalization is the process of classifying a string's data into a known data type, e.g., determining whether the string contains hours data, parking data, or accessibility data. In one embodiment, the key normalization module 318 uses a parser that performs regular expression matching to identify the keys 317. For example, the key normalization module 318 determines whether a string contains the words "open," "closed," "hours," "daily," and/or other words that signify that the string is describing business hours. In another example, the key normalization module 318 determines whether a string contains the words "parking," "valet," "lot," and/or other words that signify that the string is describing whether parking is available at the enterprise. If the key normalization module 318 recognizes a key 317 in an extracted string, it associates the string with the normalized representation of that key 317.

A value normalization module 320 normalizes values in the extracted strings. Value normalization is the process of creating a machine-understandable representation of the values provided in a string. In one embodiment, the value normalization module 320 uses parsers that perform regular expression matching to interpret the values. Certain types of values are relatively straightforward to normalize. For example, the "reservations policy" and "accessible" keys usually have values of either "Yes" or "No." The parsers for these two types of values perform normalization by determining whether the string contains the words "yes," "no," and/or equivalents. However, some values, such as business hours, are expressed in a variety of different ways. Therefore, the parsers for these types of values utilize more complex logic.

Figure 4:
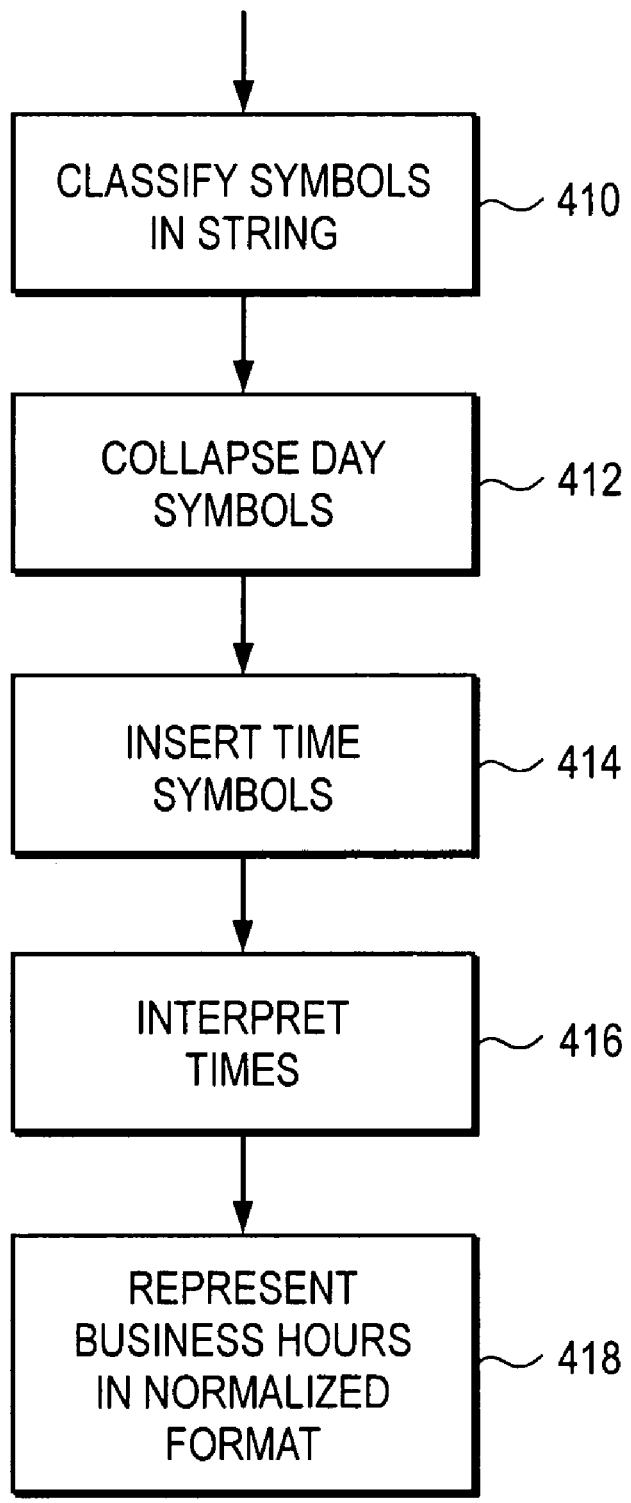
FIG. 4 is a flow chart illustrating steps performed by the value normalization module to normalize business hours according to one embodiment.

FIG. 4 is a flow chart illustrating steps performed by the value normalization module 320 to normalize a business hours value according to one embodiment. Other embodiments perform different and/or additional steps. Moreover, other embodiments perform the steps in different orders. While the steps of FIG. 4 are intended to normalize business hours, those of skill in the art will recognize that similar steps can be used to normalize other types of values.

Assume for purposes of example that an enterprise describes its business hours using the string: "open M-W 9 to 5, TH to 7." In order to create a normalized representation of the business hours, the value normalization module 320 parses the string to classify 410 the symbols within it. In one embodiment, the symbols are classified as either times, days, separators, open, closed, or ignores. Regular expressions are used to perform these classifications. In one embodiment, the meaning of these classifications and descriptions of the regular expressions used to detect them are as follows:

"Times" (T) are values that describe the times of an enterprise's business hours. Times in the string are recognized by a regular expression that detects occurrences of substrings like "##:## (AM|PM)" (where "#" is a number and AM|PM are optional subcomponents), "# o'clock," "noon," and "#### hours."

"Days" (D) are values that describe the days on which an enterprise is open or closed. Days in the string are recognized by a regular expression that detects occurrences of substrings representing days of the week like "M," "Mon." "Monday" (and equivalents for other days), "weekends," and "daily."

"Separators" (-) are symbols that separate other symbols in the string. Separators in the string are recognized by a regular expression that detects occurrences of substrings representing separators like "-" (a hyphen), "to," "until," "through," and "thru."

"Open/Closed" (O/C) are values that modify the dates and/or times in the string. These values are recognized by regular expressions that detect occurrences of "open," "closed," and/or similar substrings in the string.

"Ignores" (X) are values that are ignored when parsing the string. Ignores are removed from the string using regular expressions that detect spaces, commas, words like "and," etc.

After classification 410, the string "open M-W 9 to 5, TH to 7" is represented as "OD-DT-TD-T." The value normalization module 320 next collapses 412 sequences of "Ds" into a single "D" representing all of the days in the sequence. This step is called "D-Collapse." In one embodiment, the collapsed Ds are represented by a vector having bits describing the open days. For example, if the vector starts on a Sunday, Monday through Wednesday is represented as "0111000." After this step, the example string is represented as "ODT-TD-T."

After D-collapse, the value normalization module 320 inserts 414 time symbols into the representation if necessary. This step, called "T-insertion" occurs rarely and handles the special case where a business hours statement is missing a bounding value. For example, T-insertion handles the case where the business hours are represented as "TH to 7" instead of as "TH 9-7." In one embodiment, the value normalization module 320 examines the representation of the string for occurrences of "-T" that are not preceded by a "T," e.g., (D-T). If such a "-T" is found, the value normalization module 320 identifies the immediately preceding "T-" (if one exists), and inserts this "T" into the representation. Thus, "ODT-TD-T" is transformed into "ODT-TDT-T," which is equivalent to "open M-W 9 to 5, TH 9-7."

The value normalization module 320 next interprets 416 the times in the representation. A single "T" in the representation can have three possible interpretations: AM, PM, or AM the next day. In other words, a "1" can refer to 1 AM, 1 PM, or 1 AM the following day. In one embodiment, the value normalization module 320 uses parsers to identify "DT-T" sequences. These parsers use logic to interpret the times in these sequences. The logic is based on how most enterprises represent their business hours. For example, start times from 8 to 11 tend to be AM, start times between 5-7 tend to be PM, and end times that follow a PM start time but have lower numbers tend to be the AM of the next day. Thus, the sample string is interpreted as "open M-W 9 AM to 5 PM, TH 9 AM to 7 PM.

Upon applying these steps to the sample string, the value normalization module 320 is able to interpret the string and represent 418 the business hours in a machine-understandable normalized representation. In one embodiment, the normalized representation is a vector that describes the open business hours for each day of the week.

Returning to FIG. 3, the normalization performed by the data parsing module 316 generally falls into one of three categories: complete normalization, only key normalization, and no normalization. In complete normalization, the data parsing module 316 normalizes both the key and value contained in an extracted string. Complete normalization is the best result because it allows complete machine understanding of the fact represented by the key, value pair and allows facts from multiple sources to be compared. In one embodiment, strings providing data for "business hours," "reservation policy," and "accessibility" often fall into this category.

In "only key normalization," the data parsing module 316 can understand the type of data contained in the extracted string, but cannot produce a machine-understood representation of the value. In one embodiment, strings that provide "payments accepted" and "parking" data often fall into this category because the corresponding values are difficult to parse. In some cases this is a transitional state. Once enough values that are initially opaque (i.e., not understood) are considered, a parser can be constructed to normalize the values.

In "no normalization," the data parsing module 316 can normalize neither the key nor the value. In one embodiment, extracted strings that cannot be normalized are preserved in their extracted form. The extracted strings are then presented in the directory as-is in order to allow human interpretation of the facts contained therein.

In some embodiments, the data parsing module 316 uses the functionality of the key 318 and/or value 320 normalization modules to recognize facts as well as to understand them. If the data parsing module 316 receives a snippet of text from a web site or another source but lacks information about the meaning of the text, it can apply parsers from the normalization modules 318, 320 to the text and determine whether the parsers produce valid results. The data parsing module 316 can then classify the text based on the parser results. For example, if the business hours parser is applied to a snippet of text and produces a valid result, the data parsing module 316 recognizes that the text contains business hours information and associates a business hours key with the text.

A data clustering module 322 associates the facts (normalized or not) with the enterprises to which they pertain. In one embodiment, this clustering process is performed by associating sets of facts extracted from enterprise 118 and/or directory 120 web sites with the enterprise data received from the commercial data providers 116. The result of the clustering process is that facts which pertain to the same enterprise are grouped together.

To understand the operation of the data clustering module 322, consider the following five sets of facts:
1. Round Table Pizza
   650-961-0361
   570 N Shoreline Blvd, Mountain View, Calif.
   Open daily 11 am-10 pm
2. Round Table Pizza of Mountain View
   650-961-0361
   560 N Shoreline Blvd, Mountain View Calif. 94043
3. Safeway Food & Drug
   650-961-4868
   570 Shoreline Blvd, Mountain View Calif. 94043
   Open 24 hours
4. Round Table Pizza
   650-961-0361
   399 1st St, Los Altos Calif. 94022
   Delivery available
5. Round Table
   650-384-7463
   570 Shoreline Blvd, Mountain View Calif. 94043.

Assume that these facts are derived from five different sources. For example, set of facts #2 is derived from data received from a commercial data provider 116 while the other four sets of facts are derived from enterprise 118 and/or directory 120 web sites.

From these facts, a human observer might think that the first, second and fifth sets of facts probably describe the same enterprise (a Round Table Pizza in Mountain View). The facts slightly disagree about the street address, but it is more likely that one of the fact sources had the number wrong than it is that there are two of the same brand of pizza restaurant on the same block. There is also some disagreement about the phone number; again, maybe a data source had the number wrong, or perhaps the restaurant has multiple phone numbers. The third set of facts apparently describes a different enterprise—a Safeway grocery store—having the same address as the pizza restaurant (maybe it is in the same strip mall, which might explain some of the confusion about the Round Table address). The fourth set of facts looks like a different Round Table restaurant in Los Altos, a few miles away. The data clustering module 322 applies similar logic to the listings to identify sets of facts that pertain to the same enterprise, and to distinguish sets of facts pertaining to different enterprises.

The clustering module 322 groups the sets of facts by proximity. In one embodiment, the clustering module 322 or another module represents the location of each enterprise described by the facts using a latitude and longitude derived from the address and/or other data. Enterprises that are reasonably close to each other (give or take a radius of error, e.g. the 560/570 address confusion described above) might be the same enterprise; enterprises that are very far away (such as Mountain View and Los Altos) are almost certainly not.

To facilitate the grouping, one embodiment of the clustering module 322 divides the world into "neighborhoods," where the neighborhood size is around the "radius of error" (a couple of city blocks in most cases; closer in dense urban areas). The neighborhoods overlap; a set of facts may end up being assigned to several neighborhoods. This overlapping is allowed so fact sets can be merged with facts in adjacent neighborhoods.

The clustering module 322 compares each set of facts within a neighborhood with the other sets of facts in the neighborhood to determine whether the facts pertain to the same enterprise. In one embodiment, the clustering module 322 compares the names, phone numbers, and locations of a pair of fact sets and computes a similarity score based on these items. For comparing names, the clustering module uses textual similarity metrics based on shared words and bigrams, weighted by frequency in the corpus.

If a similarity score exceeds a threshold, the clustering module 322 merges the two sets of facts. In one embodiment, the clustering module 322 enforces certain exceptions to the merging in order to handle special conditions where the sets of facts are likely to be unrelated. One embodiment of the clustering module 322 does not merge two sets of facts with different phone numbers unless the names are identical. The clustering module 322 assigns a set of merged facts a "cluster ID" that is used to identify the group of facts for later processing. Because neighborhoods overlap, it is possible that a set of facts was merged with other fact sets, and assigned a cluster ID, in multiple neighborhoods. When this happens, the cluster ID that has the most sets of facts merged into it becomes the cluster for the enterprise.

In one embodiment, a fact comparison module 324 compares the clustered facts for an enterprise in order to establish confidence levels for the facts. As described above, when facts are derived from a variety of sources, some facts will agree and some facts will conflict. Facts that are supported by multiple sources have a high confidence level. For example, if facts derived from multiple sources agree about an enterprise's business hours, these facts are likely to be correct and, therefore, the fact comparison module 324 assigns a high confidence level to these facts. In contrast, if facts from multiple sources conflict, the fact comparison module 324 assigns a low confidence level to these facts. In one embodiment, partial and/or non-normalized facts are not assigned a confidence level.

In some embodiments, the fact comparison module 324 uses a weighting process to distinguish between conflicting facts and/or favor facts from certain sources. The weighting process can, for example, assign a greater weight to a more recent fact and a lesser weight to a less recent, conflicting fact. In addition, facts from more trustworthy sources can be assigned greater weight than other facts. Likewise, facts within sets of facts that provide more information than other sets of facts can be assigned a greater weight. A partial and/or non-normalized fact that lacks a confidence level can have a weight assigned based on the source of the fact, the number of other facts within the same set, and/or other criteria. In one embodiment, facts with low confidence levels and/or weights are discarded.

As described above, in one embodiment the facts stored in the structured data database 112 are utilized to provide a local directory of enterprises to end-users. In one embodiment, the structure generation engine 110 includes a fact presentation module 326 that specifies how the directory should present the facts stored in the structured database 112. In other embodiments, the fact presentation module 326 is located in a different entity, such as a module that renders web pages for the directory.

The fact presentation module 326 uses the confidence levels and/or weights of the facts to determine how the facts are displayed in the directory. In general, facts having greater confidence levels and/or weights are displayed, while facts having lower confidence levels and/or weights are not displayed. Displayed facts are shown with or without attribution to their sources. In one embodiment, facts that have very high confidence levels are displayed without attribution. For example, name, address, and telephone facts from the commercial data provider 116 are displayed without attribution. Other facts having lower confidence levels are displayed with attribution to the sources from where the facts were derived. In one embodiment, the attribution includes a uniform resource locator (URL) linking to the web page or other electronic document from which the fact was extracted.

If multiple sources provide the same fact, one embodiment displays only the fact having the greatest weight, and attributes the fact to the source that provided it. This technique leaves room on the page to show other facts rather than filling the page with duplicative facts. For example, if source A said that an enterprise was "Open Mon-Sat 8 am-6 pm," while source B said only that the enterprise was "Open Mon-Sat" without time information, then the fact presentation module 326 shows the fact from source A because it contains the most information (and therefore received a greater weight).

In one embodiment, facts that are partially or not normalized are displayed as-is and with attribution. That is, the extracted string describing the fact is displayed on the web page along with a link to the source of the string. This display allows the end-user to directly view and interpret the fact.

III. Process/Example

Figure 5:
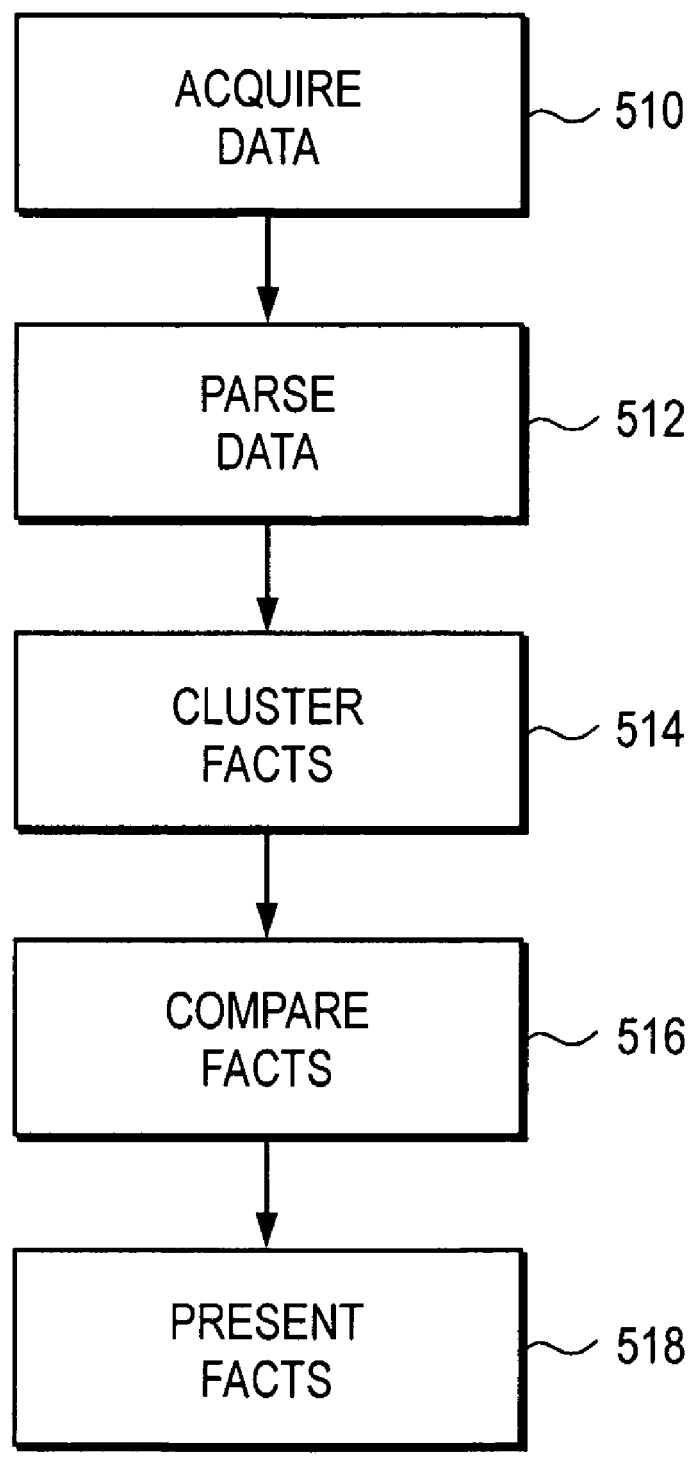
FIG. 5 is a flow chart illustrating steps performed by the structure generation engine according to one embodiment.

FIG. 5 is a flow chart illustrating steps performed by the structure generation engine 110 according to one embodiment. Other embodiments perform the steps in different orders and/or perform different or additional steps than the ones shown in FIG. 5. The structure generation engine 110 can perform multiple instances of the steps of FIG. 5 concurrently and/or perform steps in parallel.

Initially, the structure generation engine 110 acquires 510 data about enterprises from one or more sources. These sources can include commercial data providers 116, enterprise web sites 118, and/or directory web sites 120. The structure generation engine 110 extracts strings describing facts from the data.

The structure generation engine 110 parses 512 the extracted strings to produce normalized facts in a machine-understandable representation. Each string contains a key, value pair. In some cases the engine 110 can normalize both the key and value, in other cases the engine can normalize only the key, and in still other case the engine cannot normalize either the key or the value.

The structure generation engine 110 clusters 514 the facts. That is, the engine 110 associates each fact with the enterprise to which it pertains. As a result, each enterprise gains a list of one or more facts, some of which may agree and some of which may conflict. The engine 110 compares 516 the facts associated with an enterprise and, in one embodiment, assigns confidence levels and/or weights to the facts. For example, facts from multiple sources that agree are assigned a high confidence level.

At some point, the facts are presented 518 on a web page or other electronic document for the enterprise to which the facts pertain. The web page can be part of a local directory and/or provided in another context. Some facts are presented without attribution to their source, while other facts are presented with attribution. Further, some facts, such as facts having a very low confidence level and/or containing information already provided by another fact, are not shown.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A system for generating structured data, comprising:
a processor for executing computer program modules; and
a computer-readable storage medium storing executable computer program modules comprising:
   a data acquisition module for receiving an electronic document containing unstructured data describing facts about business hours of an enterprise;
   a data extraction module for extracting the unstructured data describing facts about the business hours of the enterprise from the electronic document; and
   a data parsing module for receiving the extracted unstructured data and creating structured representations of the facts about the business hours of the enterprise described by the unstructured data, wherein the data parsing module comprises:
      a value normalization module for receiving a string describing facts about the business hours of the enterprise extracted from the electronic document and for:
         parsing the string to classify symbols within the string, the parsing classifying symbols within the string as representing days of the week and classifying symbols within the string as representing times of the enterprise's business hours;
         collapsing the symbols representing days of the week in the string to form a collapsed string, the collapsed string having a symbol representing a sequence of days and the symbols representing times of the enterprise's business hours;
         interpreting the symbols within the collapsed string to determine business hours for the enterprise on the days in the sequence;
         wherein the structured representations of the facts about the business hours of the enterprise comprise a vector describing the symbol representing the sequence of days using bits indicating days of the week on which the enterprise is open.

2. The system of claim 1, wherein collapsing the symbols representing days of the week in the string comprises:
identifying a sequence of multiple symbols representing days of the week in the string; and
collapsing the sequence of multiple symbols representing days of the week into the symbol representing the sequence of days.

3. The system of claim 1, wherein the value normalization module is further for:
identifying, within the string, a description of the enterprise's business hours missing a bounding value; and
inserting a symbol representing a time of the enterprise's business hours into the string as the bounding value.

4. The system of claim 1, wherein parsing the string comprises classifying symbols within the string as representing separators that separate other symbols in the string.

5. The system of claim 1, wherein parsing the string comprises classifying symbols within the string as representing modifiers of dates and/or times represented by other symbols in the string.

6. The system of claim 1, wherein the vector describes open business hours for the enterprise on days of the week.

7. A computer-readable storage medium having computer-executable program modules for generating structured data tangibly embodied therein, comprising:
   a data acquisition module for receiving an electronic document containing unstructured data describing facts about business hours of an enterprise;
   a data extraction module for extracting the unstructured data describing facts about the business hours of the enterprise from the electronic document; and
   a data parsing module for receiving the extracted unstructured data and creating structured representations of the facts about the business hours of the enterprise described by the unstructured data, wherein the data parsing module comprises:
      a value normalization module for receiving a string describing facts about the business hours of the enterprise extracted from the electronic document and for:
         parsing the string to classify symbols within the string, the parsing classifying symbols within the string as representing days of the week and classifying symbols within the string as representing times of the enterprise's business hours;
         collapsing the symbols representing days of the week in the string to form a collapsed string, the collapsed string having a symbol representing a sequence of days and the symbols representing times of the enterprise's business hours, wherein the symbol representing the sequence of days is described in the structured representation by a vector having bits indicating days of the week on which the enterprise is open; and
         interpreting the symbols within the collapsed string to determine business hours for the enterprise on the days in the sequence;
         wherein the structured representations of the facts about the business hours of the enterprise comprise a vector describing the symbol representing the sequence of days using bits indicating days of the week on which the enterprise is open.

8. The computer-readable storage medium of claim 7, wherein collapsing the symbols representing days of the week in the string comprises:
identifying a sequence of multiple symbols representing days of the week in the string; and
collapsing the sequence of multiple symbols representing days of the week into the symbol representing the sequence of days.

9. The computer-readable storage medium of claim 7, wherein the value normalization module is further for:
identifying, within the string, a description of the enterprise's business hours missing a bounding value; and
inserting a symbol representing a time of the enterprise's business hours into the string as the bounding value.

10. The computer-readable storage medium of claim 7, wherein parsing the string comprises classifying symbols within the string as representing separators that separate other symbols in the string.

11. The computer-readable storage medium of claim 7, wherein parsing the string comprises classifying symbols within the string as representing modifiers of dates and/or times represented by other symbols in the string.

12. The computer-readable storage medium of claim 7, wherein the vector describes open business hours for the enterprise on days of the week.

13. A method for generating structured data, comprising:
using a computer to perform steps comprising:
receiving an electronic document containing unstructured data describing facts about business hours of an enterprise;

extracting the unstructured data describing facts about the business hours of the enterprise from the electronic document; and receiving the extracted unstructured data and creating structured representations of the facts about the business hours of the enterprise described by the unstructured data, wherein the receiving extracted unstructured data and creating comprises:

receiving a string describing facts about the business hours of the enterprise extracted from the electronic document;

parsing the string to classify symbols within the string, the parsing classifying symbols within the string as representing days of the week and classifying symbols within the string as representing times of the enterprise's business hours;

collapsing the symbols representing days of the week in the string to form a collapsed string, the collapsed string having a symbol representing a sequence of days and the symbols representing times of the enterprise's business hours, wherein the symbol representing the sequence of days is described in the structured representation by a vector having bits indicating days of the week on which the enterprise is open; and interpreting the symbols within the collapsed string to determine business hours for the enterprise on the days in the sequence;

wherein the structured representations of the facts about the business hours of the enterprise comprise a vector describing the symbol representing the sequence of days using bits indicating days of the week on which the enterprise is open.

14. The method of claim 13, wherein collapsing the symbols representing days of the week in the string comprises:

identifying a sequence of multiple symbols representing days of the week in the string; and collapsing the sequence of multiple symbols representing days of the week into the symbol representing the sequence of days.

15. The method of claim 13, wherein the value normalization module is further for:

identifying, within the string, a description of the enterprise's business hours missing a bounding value; and inserting a symbol representing a time of the enterprise's business hours into the string as the bounding value.

16. The method of claim 13, wherein parsing the string comprises classifying symbols within the string as representing separators that separate other symbols in the string.

17. The method of claim 13, wherein parsing the string comprises classifying symbols within the string as representing modifiers of dates and/or times represented by other symbols in the string.

18. The method of claim 13, wherein the vector describes open business hours for the enterprise on days of the week.

\* \* \* \* \*